(12) United States Patent
Al-Azzawe

(10) Patent No.: US 7,155,426 B2
(45) Date of Patent: Dec. 26, 2006

(54) SQL DEBUGGING USING STORED PROCEDURES

(75) Inventor: Abdul Hamid Al-Azzawe, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 09/957,970

(22) Filed: Sep. 20, 2001

(65) Prior Publication Data

US 2003/0066053 A1    Apr. 3, 2003

(51) Int. Cl.
*G06F 17/30* (2006.01)

(52) U.S. Cl. .......................... 707/3; 707/10; 715/968; 717/124

(58) Field of Classification Search ........ 717/124–127, 717/114–116; 707/1–5, 10, 104.1; 719/320; 715/762–768, 961, 968
See application file for complete search history.

(56) References Cited

U.S. PATENT DOCUMENTS

| | | | |
|---|---|---|---|
| 5,815,653 A | 9/1998 | You et al. | 395/183.14 |
| 5,850,550 A * | 12/1998 | Li et al. | 717/154 |
| 5,892,941 A * | 4/1999 | Khan et al. | 703/22 |
| 6,058,393 A | 5/2000 | Meier et al. | 707/10 |
| 6,061,517 A | 5/2000 | House et al. | 395/704 |
| 6,108,659 A * | 8/2000 | Vincent | 707/101 |
| 6,219,782 B1 * | 4/2001 | Khan et al. | 712/227 |
| 6,324,683 B1 * | 11/2001 | Fuh et al. | 717/124 |
| 6,477,540 B1 * | 11/2002 | Singh et al. | 707/103 R |
| 6,560,592 B1 * | 5/2003 | Reid et al. | 707/2 |

FOREIGN PATENT DOCUMENTS

CA      2205096      11/1998

* cited by examiner

*Primary Examiner*—Antony Nguyen-Ba
(74) *Attorney, Agent, or Firm*—Sandra M. Parker, Esq.

(57) ABSTRACT

A method, apparatus and article of manufacture is provided for SQL debugging within a computer system network. The method uses stored procedures via a console for debugging of SQL instructions located in a server, wherein preferably only one database communication line exists between the server and the console. The server has a database management system for retrieving data from a database stored in an electronic storage device coupled to the server. The method uses a debugger manager at the console for commanding and monitoring debugging operations of the server-side SQL instructions performed by a debugger engine, and uses stored procedures of a debugger router as a database communication interface for receiving commands and sending status reports between the debugger manager and the debugger engine.

44 Claims, 2 Drawing Sheets

SQL DEBUGGING USING STORED PROCEDURES

RELATED APPLICATION

The present invention is related to a co-pending application entitled: "SQL Debugging Using XML Dataflows", Ser. No. 09/957,795, filed concurrently, assigned to the assignee of the present invention and fully incorporated herein by reference.

BACKGROUND OF THE INVENTION

1. Field of the Invention

This invention relates in general to database management systems performed by computers, and in particular to an optimized remote computer system database debugging, monitoring and managing technique useable in a client-server computing environment.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

Recently, Persistent SQL Modules (PSM) language became a standard language for coding SQL-based logic, such as stored procedures, user defined functions (UDFs) and triggers. PSM is very similar to Microsoft SQL Server's TSQL and Oracle PL/SQL, which are proprietary technologies and thus not standard. PSM allows for the development of DB2 stored procedures using the SQL language.

As with any development language, there exists a need to provide an efficient mechanism for debugging routines coded in SQL language, and especially for debugging stored procedures with SQL instructions. An efficient debugger currently exists for IBM DB2's Java and C/C++ stored procedures, which are currently debugged using IBM's Visual Age distributed debugger. There is a clear need to provide a similar cross-platform debugging support for SQL stored procedures. However, an efficient debugger for SQL stored procedures does not exist yet, and it has to be designed specifically for debugging SQL instructions written in PSM, because current DB2 implementation of PSM requires pre-compilation of PSM source code into C language code.

Currently, the support for DB2's SQL language stored procedures is achieved through a three-step compilation process. Step one compiles a PSM SQL stored procedure to an embedded SQL C file (file-name.sqc) using the DB2 PSM compiler. Step two compiles the file-name.sqc file to a standard C file using the DB2 SQL precompiler. Step three compiles the C file to generate the required execution library using any of the supported C language compilers. Therefore, the current implementation of PSM by DB2 is based on precompiling the PSM source into C language code, although in the future PSM may become an interpreted SQL language.

The basic requirement of any debugger is the ability to step through the original source code, view and modify variables, manage breakpoints, and capture execution exceptions. The C/C++ debugger is not suited to handle the debugging of SQL instructions, because the original PSM source code has to undergo three compilation steps, mentioned above, where the SQL language commands are translated into C language calls, and the SQL variables are translated into C language structures. Further, each SQL statement translates into multiple C language calls across multiple lines of code. Moreover, SQL language exception handling is very different from C/C++ exception handling, for which C/C++ debuggers are designed.

Attempts have been made to utilize the IBM's Visual Age C/C++ distributed debugger to debug SQL stored procedures. This is accomplished through some complex line macro mapping to the original SQL source file. However, there are a number of problems with this implementation that makes it very unusable. For example, C/C++ debugger is not suited for SQL language debugging because each SQL statement translates into multiple C statements, which may require multiple debugger commands to step over each line of SQL code. Next, SQL variable types translate into C structures foreign to SQL programmers. Moreover, SQL variable names are mangled while they go through the three compilation steps, and thus become hard to read by a SQL programmer. Furthermore, SQL variable values cannot be formatted according to SQL type value formatting, since they are treated as plain C/C++ types. Besides, SQL exception handling differs from C/C++ exception handling, making it difficult to detect by C/C++ debuggers.

Further, C/C++ debuggers work through standard debugger process attachment. This is an unacceptable risk to be taken by database administrators, as it not only assumes control of the SQL routine being debugged, but also the entire database engine, affecting all of its users. Moreover, C/C++ debuggers are not applicable to interpreted languages.

While there have been various techniques developed for optimizing the remote systems debugging and management functions, there is still a need in the art for further optimization techniques involving remote systems debugging operations. Therefore, it would be advantageous to provide a computer method that efficiently debugs and controls the target computer site, is easy to implement and maintain, and decreases the use of communication resources between processors.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a method for SQL debugging within a computer system network. The method uses stored procedures via a console for debugging of SQL instructions located in a server, wherein preferably only one database communication line exists between the server and the console. The server has a database management system for retrieving data from a database stored in an electronic storage device coupled to the server. The method uses a debugger manager at the console for commanding and monitoring debugging operations of the server-side SQL instructions performed by a debugger engine, and uses stored procedures of a debugger router as a database communication interface for receiving commands and sending status reports between the debugger manager and the debugger engine.

The debugged SQL instructions are selected from a group comprising stored procedures, user defined functions and triggers. The method may invoke a database manager Data Access Remote Interface (DARI) process for performing debugging in a fenced server address and process space. The debugging method provides call-stack tracking, line-by-line execution status reporting, line breakpoints management, variable change breakpoints management, and has variable value reporting and modification capabilities. The debugging is performed through debugger interface software instructions, inserted during compilation of the SQL instructions as debugger hooks, for tracing the execution of the SQL instructions. The debugger interface software instructions include C API calls as debugger hooks which provide for each SQL instruction a source code line number for each SQL statement, names of variables declared by each SQL DECLARE statement, including the SQL type information, names of variables modified by the SQL statement, a current SQL code and state, for each routine entry and exit information, and for each exception entry and exit information.

Another preferred embodiment of the present invention is an apparatus implementing the above-mentioned method embodiment of the present invention.

Yet another preferred embodiment of the present invention is a program storage device readable by a computer tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, method and program storage device embodying a program of instructions executable by a computer to perform the method of the present invention using stored procedures for debugging, monitoring and managing execution of stored procedures, user defined functions (UDFs), triggers and other relational database remote server resources in a computer network. The method and system are preferably used in a distributed computing environment in which two or more computer systems are connected by a network, including environments in which the networked computers are of different types. At least one database manager software system is installed on and runs on the networked server computer system. A network client computer system acts as the console for debugging, monitoring and managing resources present on a server computer system in the network.

Although described herein in reference to debugging of stored procedures, the present invention is also applicable to debugging of UDFs and triggers, and especially useful for debugging of SQL instructions written in Persistent SQL Modules (PSM) language. While the preferred embodiments of the present invention are preferably debuggers for PSM SQL, the present invention is not limited to PSM, but can be used for any client-server database manager debugging operation, where the debugging session is invoked from a remote location, such as for debugging PL/SQL or TSQL instructions.

Figure 1:
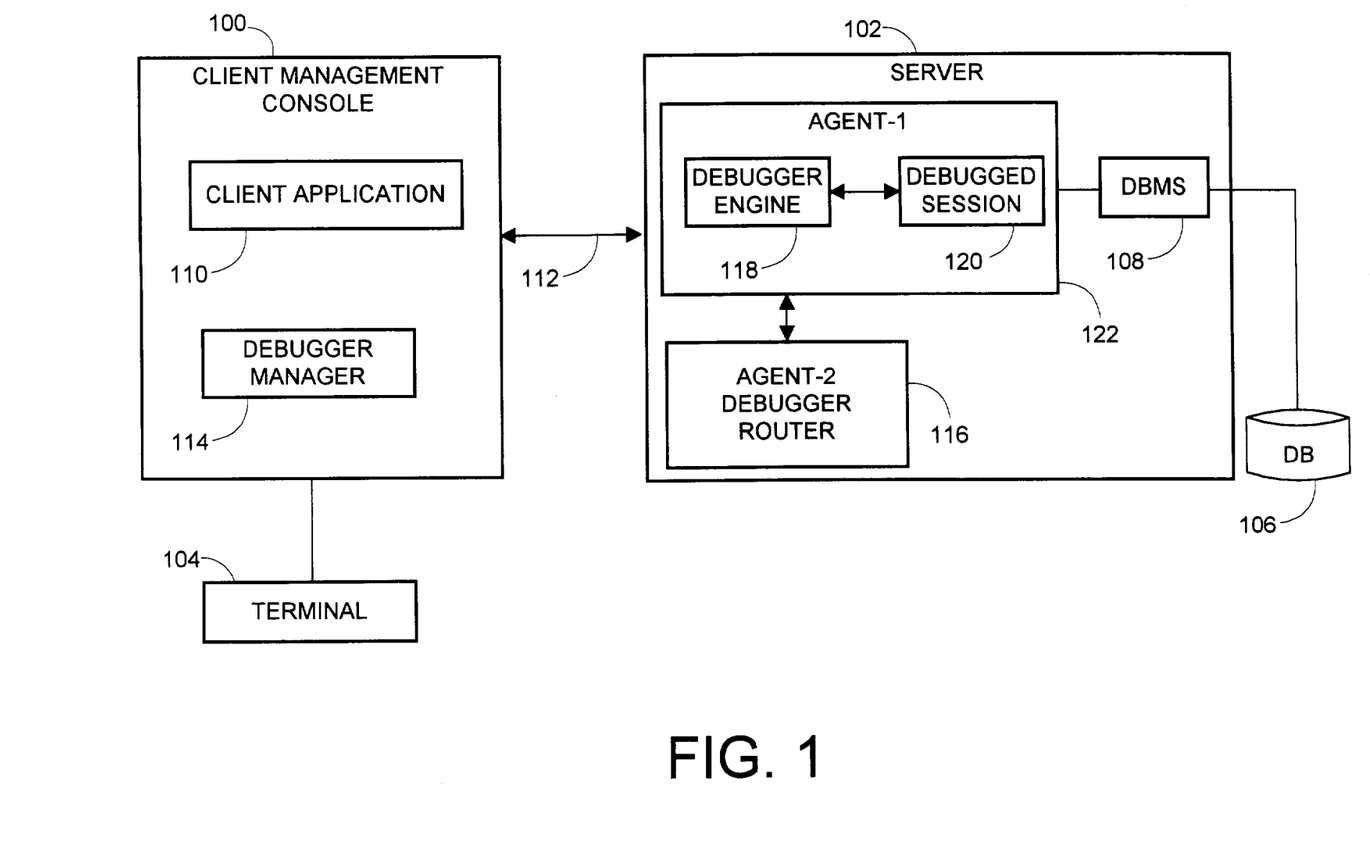
FIG. 1 illustrates a computer hardware and software environment enabling trusted stored procedure debugging operations, according to some preferred embodiments of the present invention.

FIG. 1 illustrates an exemplary computer hardware and software environment useable by some preferred embodiments of the present invention. The environment includes a client management console 100 and a database server 102, each having one or more conventional processors (not shown) executing instructions stored in an associated computer memory (not shown). The operating memory can be loaded with instructions received through an optional storage drive or through an interface with the network. The preferred embodiments of the present invention are especially advantageous when used in a network environment, having a console terminal 104 on the console 100 site, with the console 100 site processor networked to the server 102 site processor.

The database server 102 site processor is connected to one or more electronic storage devices 106, such as disk drives, that store one or more relational databases. Storage devices may also be used on the console 100 site. They may comprise, for example, optical disk drives, magnetic tapes and/or semiconductor memory. Each storage device permits receipt of a program storage device, such as a magnetic media diskette, magnetic tape, optical disk, semiconductor memory and other machine-readable storage device, and allows for method program steps recorded on the program storage device to be read and transferred into the computer memory. The recorded program instructions may include the code for the method embodiment of the present invention. Alternatively, the program steps can be received into the operating memory from a computer over the network.

Operators of the console terminal 104 use a standard operator terminal interface (not shown), such as IMS/DB/DC, CICS, TSO, OS/2 or other similar interface, to transmit electrical signals to and from the console 100, that represent commands, termed queries, for performing various debugging operations, as well as search and retrieval functions, against the databases stored on the electronic storage device 106. In the present invention, these queries preferably conform to the Structured Query Language (SQL) standard, and invoke functions performed by a DataBase Management System (DBMS) 108 located at the server 102 site, such as a Relational DataBase Management System (RDBMS) software. In the preferred embodiments of the present invention, the RDBMS software is the DB2 product, offered by IBM for the AS400, OS390 or OS/2 operating systems, the Microsoft Windows operating systems, or any of the UNIX-based operating systems supported by the DB2. Those skilled in the art will recognize, however, that the present invention has application to any RDBMS software that uses SQL statements, and may similarly be applied to non-SQL queries.

FIG. 1 further illustrates a software environment enabling preferred embodiments of the present invention to be useable for debugging of trusted stored procedures. Trusted or unfenced SQL stored procedures are stored procedures that are allowed to run in the same address and process space as the database server 102 operations, because there is no need for special protection. In the system shown in FIG. 1, the client management console 100 further includes a client application software 110 of the present invention, capable of communicating with the database server 102 via a standard database connection communication line 112, to invoke loading and running of a trusted SQL stored procedure on the database server 102. The client management console 100 also includes a debugger manager software 114 with a user's interface (UI) that is capable of communicating with the database server 102 via the same standard database connection communication line 112, during debugging.

Two server 102 site database manager agents (threads/processes) are used with the preferred embodiments of the present invention for debugging of a trusted SQL stored procedure on the database server 102. They both use the database connection communication line 112 to communicate with the console 100. Prior to debugging, the console-based client application 110 invokes an agent-1 122 on the server 102, which starts a debugger engine 118, and commands it to load and start a debugged session 120, running the trusted SQL stored procedure on the database server 102. Afterwards, the trusted SQL stored procedure of the debugged session 120 is executed and debugged by the debugger engine 118 software. A session is a process (thread) executing some application software, which may include SQL stored procedures. The agent-1 122 is also connected with the DBMS 108 and has access to the database items. It returns the debugging results back to the client application 110, using the same database connection communication line 112.

After the loading of the trusted SQL stored procedure, the debugging is commanded and monitored from the console terminal 104 via the debugger manager 114 software, which communicates with a debugger router 116 software, running on the server 102 as agent-2. The debugger router 116 software uses its own SQL stored procedures to communicate with the console 100 through the database connection communication line 112. When the debugging and managing commands are on the server 102 site received by the debugger router 116, it then invokes an appropriate system routine, sent to the debugger engine 118 to initiate or perform the debugging of the debugged session 120, according to the request sent from the client management console 100, and to return the requested information to the debugger manager 114 at the console 100 site. The debugger router 116 uses a set of stored procedures that are invoked by the debugger manager 114 to initiate and terminate the debugging, as well as send and receive data from the debugger engine 118. Therefore, the debugger router 116 acts as a data router by forwarding client data from the debugger manager 114 to the debugger engine 118 and vice versa.

Figure 2:
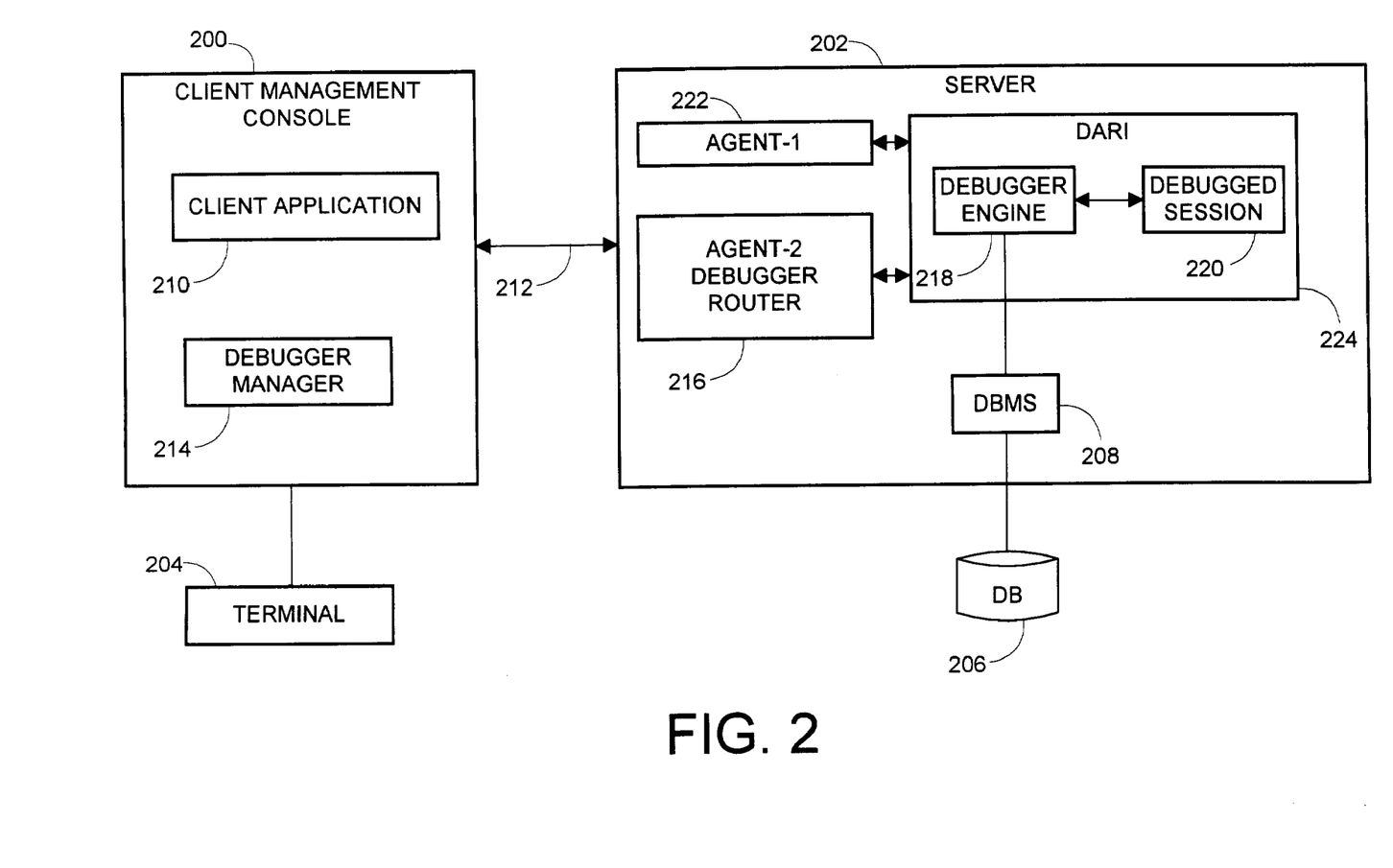
FIG. 2 illustrates a computer hardware and software environment enabling non-trusted stored procedure debugging operations, according to other preferred embodiments of the present invention.

In all preferred embodiments of the present invention, shown in FIGS. 1 and 2, the debugging of the debugged session is performed through a debugger interface software. When a SQL stored procedure is compiled in debug mode, before its execution is requested by the client application, a set of debugger interface calls is included in the stored procedure code. During the debugging, these debugger interface calls are executed prior to and after executing the stored procedure SQL statement, to report the status of the stored procedure being executed and debugged. The status report includes information such as the name of the stored procedure, the current line of execution, the current variable SQL types and values, the values of the special SQLCODE and SQLSTATE DBMS registers, etc. Since the current implementation of PSM by the DB2 is based on precompiling the PSM source code into C language code, in the current implementation of the preferred embodiments of the present invention the PSM debugger interface is thus a set of C API (application programming interface) calls, that are inserted into the generated C code by the PSM compiler as debugger hooks, to trace the execution of the SQL stored procedure. Thus, these C API calls act as the interface to the debugger engine 118. An example of a list of the PSM debugger interface C APIs insertable in the compiled PSM code, useable in the present invention, is presented below.

```
Void pd_EnterRoutine(
    Int Line,
    Char* pRoutineName,
    Char* pSchema,
    Char* pSpecific,
    Int RoutineType);
Void pd_AtLine(
    Long Sql Code,
    Char* pSql State,
    Int Line,
    Int Indent);
Void pd_VarRegister(
    Char* pVarName,
    Char* pVarScope,
    Void* pVarAddr,
    Int VarType,
    Int VarSize,
    Int VarScale);
Void pd_VarMayChanged(
    Char* pVarName,
    Char* pVarScope);
Void pd_EnterException(
    Long Sql Code,
    Char* pSql State,
    Int Line,
    Int Indent);
Void pd_ExitException( );
Void pd_ExitRoutine(
    Int Line,
    Int rc);
``` where:
  pRoutineName is the name of the SQL stored procedure (SP) or UDF. trigger, etc.
  pSchema is the DB2 database schema identifier for the SP/UDF
  pSpecific is the specific name for the SP, UDF, etc.
  RoutineType is the type of the SQL routine: SP, UDF, etc.
  Line is the text line number as per the original SQL source file
  Indent is the code block indentation level
  pVarName is the name of the SQL variable
  pVarScope is the block scope of the variable in the source code
  pVarAddr is the memory address for the variable storage
  VarType is the SQL type of this variable
  VarSize is the size of the var (e.g. char array size)
  VarScale is the scale value for a decimal variable
  Sql Code is the current database server SQL code value
  pSql State is the current database server SQL state value
  rc is the return code, if any The debugger engine 118 software is installed on and runs on the server 102 computer system in the network. The debugger engine 118 is responsible for monitoring the execution of the loaded SQL stored procedure, and for enforcing requests for execution of the next SQL stored procedure statement. Another stored procedure may be nested and its execution be requested by the previous stored procedure. The debugger engine 118 may accomplish the request enforcement by implementing a rule that the debugger interface call does not return unless the debugger engine 118 decides that the next SQL statement is to be executed. The debugger engine 118 receives client debugger manager 114 commands and sends debugger status reports back to the client console 100. This data exchange is carried forth using the debugger router 116. The debugger engine 118 preferably communicates with the debugger router 116 using system message queues, a standard inter-process communication mechanism.

FIG. 2 illustrates a computer hardware and software environment enabling non-trusted stored procedure debugging operations, according to other preferred embodiments of the present invention. Non-trusted (fenced) SQL stored procedures are stored procedures that are run in a separate address and process space of a server 202, isolated from the regular database server 202 address and process space. The system shown in FIG. 2 is very similar to the system shown in FIG. 1. A client management console 200 includes a terminal 204, a processor (not shown) and a memory (not shown). It also includes a client application 210 software and a debugger manager 214 with a user's interface (UI), that is capable of communicating with the database server 202 via a standard database connection communication line 212, during debugging.

In the server 202, there is a processor (not shown) and a memory (not shown). The database server 202 site processor is connected to one or more electronic storage devices 206, and a DBMS 208. The same two server 202 site database manager agents (threads) are used with these preferred embodiments of the present invention of FIG. 2 for debugging of non-trusted SQL stored procedures on the database server 202. They both use the database connection communication line 212 to communicate with the console 200. Prior to debugging, the console-based client application 210 invokes an agent-1 222 on the server 202, which starts a debugger engine 218, and commands loading and running of the non-trusted SQL stored procedure on the database server 202. The non-trusted SQL stored procedure is executed and debugged by the debugger engine 218 software in a debugged session 220. The agent-1 222 returns the debugging results back to the client application 210, using the same database connection communication line 212.

After the loading of the non-trusted SQL stored procedure, the debugging is commanded and monitored from the console via the debugger manager 214 software, which communicates with a debugger router 216 software, running on the server 202 as agent-2. The debugger router 216 software uses its own SQL stored procedures to communicate with the console 200 through the database connection communication line 212. When the debugging and managing commands are on the server 202 site received by the debugger router 216, it then invokes an appropriate system routine sent to the debugger engine 218, to initiate or perform the debugging of the debugged session 220, according to the request sent from the client management console 200, and to return the requested information to the debugger manager 214 at the console 200 site.

However, in the non-trusted preferred embodiments of the present invention, there is a new component, a database manager Data Access Remote Interface (DARI) process 224, executing in a separate address and process space. When the client application 210 invokes a server side non-trusted SQL stored procedure, the database manager agent-1 222 creates a separate, DARI process 224 on the server 202 machine and communicates with this DARI process 224 to execute the requested SQL stored procedure. The DARI process 224 executes the stored procedure, accessing the DBMS 208, and returns the results back to the database agent-1 222. The database agent-1 222 in-turn returns the results of this execution back to the client application 210, using the database connection communication line 212. Since the DARI process 224 is the server 202 process that executes the stored procedure, in these preferred embodiments of the present invention the debugger session 220 and debugger engine 218 are thus loaded as parts of the DARI process 224, as shown in FIG. 2.

As mentioned above, in the preferred embodiments of the present invention, the described methods enable client-side debugging of server-side SQL stored procedures by extending a compiler to insert debugger hooks at the source level. Therefore, the preferred methods perform step-by-step debugging, by interruption of each executed instruction of a session running the stored procedure on a database server. A remote client location debugger manager, attached to the database server via a database communication line, is used to route debugger data and commands using a set of router stored procedures. While the preferred embodiments of the present invention are preferably debuggers for SQL compilers useable for PSM stored procedures with SQL instructions, the principles of the present invention are not limited to debuggers for PSM SQL instructions but can be used for any client-server database manager debugging operations, where the debugging session is invoked from a remote location.

Although shown in regard to debugging of stored procedures, the present invention can also be used in a similar way for debugging of SQL UDFs and SQL triggers, as both of these use PSM and are compiled in the same manner. As mentioned previously, in the present invention, the PSM debugger interface uses special debug C API calls as hooks. The PSM compiler inserts one or more of these debug C API calls before or after each compiled SQL statement when debugging may be needed. When a SQL stored procedure is compiled in debug mode, these debug C API calls are compiled-in and processed. However, when debugging is not needed in release mode, these debug C API calls are defined as no-operation (no-op'd) and compiled out from the SQL stored procedures. Shown below is an example of a SQL stored procedure with the required PSM Debugger Interface C API hooks inserted in the original source code of the stored procedure. The PSM Compiler inserts the following set of C APIs in the compiled PSM code as debugger hooks to trace the execution of the SQL stored procedure.

```
CREATE PROCEDURE iterator( )LANGUAGE SQL
  BEGIN
    pd_EnterRoutine(1, "iterator", "Abdul", "iterator", SP);
    pd_AtLine(SQLCOCDE, SQLSTATE, 3, 1);
    DECLARE SQLSTATE CHAR(5);
    pd_AtLine(SQLCOCDE, SQLSTATE, 4, 1);
    DECLARE at_end INT DEFAULT 0;
    pd_VarRegister("at_end", "iterator", &at_end, INT, 4, 0);
    pd_AtLine(SQLCOCDE, SQLSTATE, 5, 1);
    LOOP
    pd_AtLine(pDbgHdl, 6, 2);
    FETCH c1 INTO v_dept, v_deptname;
    pd_VarMayChanged("v_dept", "iterator");
    pd_VarMayChanged("v_deptname", "iterator");
    pd_AtLine(SQLCOCDE, SQLSTATE, 7,2);
    IF at_end=1 THEN
    pd_AtLine(SQLCOCDE, SQLSTATE, 8, 3);
    LEAVE ins_loop;
    pd_AtLine(SQLCOCDE, SQLSTATE, 9,2);
```

END IF;
pd_AtLine(SQLCOCDE, SQLSTATE, 10, 1);
END LOOP
pd_AtLine(SQLCOCDE, SQLSTATE, 11, 0);
END
pd_ExitRoutine(12, rc);

The PSM debugger interface calls the debugger engine 118, 218, and provides the functionality required of a full-fledged SQL debugger, such as call-stack tracking, line-by-line execution status reporting, line breakpoints, variable change breakpoints management, and variable value reporting and modification capabilities. The line-by-line inserted debug C API calls provide such information as the original source line number for each SQL statement, a list having names of variables declared by each SQL DECLARE statement including the SQL type information, a list having names of variables modified by the SQL statement, and a current SQL code and state. For each routine call the inserted debug C API call includes a routine entry and exit at the start and end of a SQL stored procedure, used to supply the routine information. For each exception call the inserted debug C API call includes an exception entry and exit at the start and end of a SQL exception handler, used to supply the exception information.

In the present invention, the client application 110, 210 requests execution of a stored procedure being debugged on the server 102, 202 site, where the debugging is controlled by a client at the client console 100, 200 site. In the preferred embodiments the client uses the debugger router 116, 216 stored procedures to communicate debugger user interface commands to the debugger engine 118, 218 located at the database server 102, 202 site, to control and monitor the execution flow of the debugged session 120, 220 having SQL stored procedures being debugged. Therefore, the client uses stored procedures for communication with the debugger router 116, 216, and the debugger router uses local inter-process communication message queues to communicate with the debugger engine 118, 218. The debugger router forwards messages sent back and forth between the session, at the database server site, and the client at the client 110, 200 site.

The debugger router uses a set of stored procedures required to facilitate data exchange between the debugger engine and the debugger manager. They include at least these four stored procedures: Initialize, Command, GetStatus and Terminate. The Initialize stored procedure is used to initialize the debugger router and establishes the message queue required to communicate with the debugger engine. The Command stored procedure is used to route debugging commands and data to the debugger engine. The GetStatus stored procedure is used to retrieve the status of the data obtained during the debugging operation. The Terminate stored procedure is used to terminate the debugger router operation and the communication message queue and cleans up the server's resources. In order to insure that the various debugger router Command and GetStatus stored procedures are routed to the same database agent, no transaction commit calls can be issued between the Initialize call and the Terminate call. This has no impact on the database logs, as no real database resources are locked by these debugger router stored procedures. An example of a set of stored procedures used by the debugger router 116 of the present invention, preferably defined in the db2psmdr library, is presented below.

1. Stored procedure used to initialize the debugger engine for a specific debug session identifier:

```
db2psmdr!psmd_Initialize (
    IN DOUBLE SessionId,
    OUT INTEGER Result);
```

2. Stored procedure used to terminate and cleanup server resources for a specific debug session identifier:

```
db2psmdr!psmd_Terminate (
    IN DOUBLE SessionId,
    OUT INTEGER Result);
```

3. Stored procedure used to route user commands to the debugger engine for a specific debug session identifier:

```
db2psmdr!psmd_Commands (
    IN DOUBLE SessionId,
    IN LONG VACHAR TextStream,
    IN LONG VACHAR FOR BIT DATA BinaryStream,
    OUT INTEGER Result);
```

4. Stored procedure used to receive the debugger engine status report for a specific debug session identifier:

```
db2psmdr!psmd_GetStatus (
    IN DOUBLE SessionId,
    OUT LONG VARCHAR TextStream,
    OUT LONG VARCHAR FOR BIT DATA
        BinaryStream,
    IN INTEGER WaitTimeOut,
    OUT INTEGER MoreDataPending,
OUT INTEGER Result);
```

In the present invention, since the debugger router uses stored procedures to act as message routers between the debugger engine and the debugger manager, this enables the client to perform the debugging of the server-side SQL stored procedures using the same standard DB2 communication connection line 112, 212 between the server site and client site, and does not require use of a separate connection and communication protocol. Using the stored procedures within the debugger router greatly simplifies the communication mechanism required between the client and the server, and provides a standard, well-known database communication interface for exchanging data between the debugger manager and debugger engine. The debugger manager invokes the debugger router stored procedures to send and receive data, whilst the debugger router communicates with the debugger engine using standard inter-process communication (IPC) mechanism, such as message queues, as they reside on the same server site where the debugged SQL stored procedures are running.

The preferred embodiments of the present invention thus avoid the key disadvantage of using the IBM Visual Age distributed debugger for debugging Java and C/C++ stored procedures, which rely on using TCP/IP to communicate back and forth between the server side component of the debugger and the client side debugger manager component of the debugger. Such implementation introduces additional complexity associated with setting up the proper protocol between the client and the server, whereby the server must establish a connection to a client deamon process using the pre-set TCP/IP address and port numbers. Setting up this type of model is very complex and requires a number of manual steps. Firewalls and DHCP are another obstacle in providing this type of communication mechanism. In the present invention, the use of stored procedures in the server side debugger router eliminates all this complexity, as the debugger router of the present invention uses for the communication the same DB2 communication line and protocol that is already configured by the client in order to invoke the original stored procedures being debugged, and is used for other database operations and applications, such as for database updates, etc.

The mechanism for exchange of communication debugging commands and data between the debugger engine and the debugger manager via the debugger router of the preferred embodiments of the present invention simplifies the communication protocol and content of messages sent back and forth, and eliminates the need for complex data formats and interfaces. There are two types of data that must be exchanged between the debugger engine and the debugger manager: debugging commands sent from the debugger manager to the debugger engine to control and monitor the execution of the stored procedures being debugged, and status reports sent from the debugger engine to the debugger manager reporting the status of the stored procedures being debugged.

Debuggers, regardless of language they are used with, provide a standard set of debugging commands to control the execution of the routine being debugged. Listed bellow are some of these standard debugging commands, including some SQL specific extensions, that are supported by the debugger of the present invention. The debugger of the present invention is able to support at least the following debugging commands from the debugger manager, sent to the debugger engine managing the stored procedures being debugged via the debugger router Command stored procedure: Run, Run to Line, Step Into, Step Over, Step Out, Step Return, Pause, Add Line Breakpoints, Add Variable Breakpoints, Toggle Breakpoint (enabled/disabled), Remove Breakpoints, Get Large Variable Values, Set Large Variable Value, Set Variable Value, and Run to Completion Without Further Debugging.

Run command is used to run the instructions until breakpoint is encountered or to the end. Run to Line command is used to run to the cursor line or until breakpoint is encountered. Step Into command is used to step into the next line of code. If the statement is a call to a procedure, the next statement will be the first statement in the called stored procedure. Step Over command is used to step over the next line of code skipping over any nested block of statements. If the statement is a call to another procedure, the debugging engine steps over and executes the called procedure as a unit, and then steps to the next line of code. Step Out command is used to get out of the current block of code. Step Return command is used to get out of current nested procedure and go back to the caller procedure. Pause command is used to stop the run command on the next possible line of code. Add Line Breakpoints command is used to add breakpoints for specific lines of code. Add Variable Breakpoints command is used to add variable value-changed breakpoints for specific variables. Toggle Breakpoint command is used to enable/disable breakpoints. Remove Breakpoints command is used to remove breakpoints. Get Large Variable values is used to retrieve a range value for a large variable type. Set Large Variable value command is used to modify a range value for a large variable type. Set Variable Value command is used to modify a variable value. Run to Completion command is used to run the stored procedure to completion without breaking.

Debuggers, regardless of language, also provide a standard set of debugging status reports to show the status of the routine being debugged. Listed bellow are some of these reports that are supported by standard debuggers, including some SQL specific extensions, that are also supported by the debugger of the present invention. The debugger of the present invention is able to support at least the following debug reports sent by the debugger engine managing the stored procedures being debugged, and retrieved by the debugger manager via the debugger router GetStatus stored procedure: Add Routine, Update Call Stack, Define Variable, Variable Value, Large Variable Value, Set Variable Visibility, At Line, At Breakpoint, At Exception, and End Run.

Add Routine status command is used to inform the debugger manager to load a new routine source due to a routine entry event. Update Call Stack status command is used to inform the client debugger manager of the current execution call stack. Define Variable status command is used to add a new routine variable that has now been declared. Variable Value status command is used to report a change in the current value of a variable. Large Variable Value status command is used to report a large variable value range due to a variable value change. Set Variable Visibility status command is used to toggle a variable visibility due to nesting of blocks that have DECLARE statements. At Line status command is used to report current execution line. At Breakpoint status command is used to report breaking due to encountering a line or a variable breakpoint. At Exception command is used to report encountering an exception. End Run status command is used to indicate that the routine has run to completion and debugging has been terminated.

The debugger of the present invention will soon be implemented under the name PSM Debugger in DB2's latest addition to the application development tool suite, in the DB2 UDB version V7.2, providing PSM debugging support for UNIX, Windows and other platform support. It will preferably be used for developing applications for DB2 servers in SQL PSM language, using stored procedures, UDF and triggers. The PSM debugger gives a user the ability to perform source-level debugging of PSM code. The DB2 Stored Procedure Builder will also be provided with this product, which includes the debugger manager user interface to the PSM Debugger, allowing the user to remotely debug server-side SQL stored procedures and other resources. The debugger manager user interface will be used to display the debugging session states, including all of the debugger views (such as, source code, variables, call stack, and break points), received from the server-side debugger engine, and to forward user commands to the debugger engine.

The present invention works with any of the IBM database manager products, such as DB2 for VM/VSE, DB2 for OS/390, DB2 for AS/400, DB2 Common Server, DB2 Universal Database. However, the technology may be applied to any other database manager products, such as Oracle, Informix, Sybase, SQL Anywhere, and Microsoft SQL Server, and other relational and non-relational products. The present invention allows for rapid and timely remote site software debugging, and minimizes the load on the network to initialize and maintain the remote site debugging operation. It may be applied to multivendor sources and targets, including Oracle, Sybase, Informix, Microsoft SQL Server, and others. It may be used with multidatabase servers that provide a single-site image to all data, relational and non-relational, local and remote, from IBM and non-IBM platforms, as though the data were local, regardless of the differences in SQL dialects, data access methods, networking protocols, and operating systems, in truly heterogeneous environments.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for SQL debugging within a computer system network, using stored procedures via a console for debugging of SQL instructions located in a server having a database management system for retrieving data from a database stored in an electronic storage device coupled to the server, the method comprising the steps of:
    (a) debugging of the server-side SQL instructions performed by a server-side debugger engine; and
    (b) using stored procedures from a server-side debugger router as a database communication interface between the console and the debugger engine.

2. The method according to claim 1, wherein the stored procedures being located in the debugger router serving as database communication interface for receiving commands and sending status reports between the console and the debugger engine.

3. The method according to claim 1, wherein the SQL instructions being written in Persistent SQL Modules (PSM) language.

4. The method according to claim 1, wherein the SQL instructions being written in PL/SQL language.

5. The method according to claim 1, wherein the SQL instructions being written in TSQL language.

6. The method according to claim 1, wherein the method being used in a distributed computing environment wherein at least two computer systems being connected by the network, and the computer systems having computers of different type.

7. The method according to claim 1, wherein the stored procedures being provided for managing server network resources.

8. The method according to claim 1, wherein only non-proprietary database connections being required between the server and the console.

9. The method according to claim 1, wherein the SQL instructions being selected from a group comprising stored procedures, user defined functions and triggers.

10. The method according to claim 1, further comprising the step of invoking a database manager process for performing debugging in a fenced mode.

11. The method according to claim 1, wherein the debugging method providing call-stack tracking, line-by-line execution status reporting, line breakpoints management, variable change breakpoints management, and variable value reporting and modification capabilities.

12. The method according to claim 1, wherein the debugging being performed through debugger interface software instructions, inserted during compilation of the SQL instructions as debugger hooks, for tracing the execution of the SQL instructions.

13. The method according to claim 12, wherein the debugger interface software instructions including C Application Programming Interface (C API) calls as debugger hooks.

14. The method according to claim 13, wherein the inserted C API calls providing for each SQL instruction a source code line number for each SQL statement, names of variables declared by each SQL DECLARE statement, including SQL type information, names of variables modified by the SQL statement, a current SQL code and state, for each routine entry and exit information, and for each exception entry and exit information.

15. The method according to claim 1, wherein the database communication interface enabling the console to command and monitor debugging operations of the server-side SQL instructions performed by the debugger engine.

16. A SQL debugger system within a computer system network, using stored procedures via a console for debugging of SQL instructions located in a server having a database management system for retrieving data from a database stored in an electronic storage device coupled to the server, the system comprising:
    a server-side debugger engine for debugging of the server-side SQL instructions; and
    a server-side debugger router using stored procedures as a database communication interface between the console and the debugger engine.

17. The system according to claim 16, wherein the debugger router serving as a database communication interface for receiving commands and sending status reports between the console and the debugger engine.

18. The system according to claim 16, wherein the SQL instructions being written in Persistent SQL Modules (PSM) language.

19. The system according to claim 16, wherein the SQL instructions being written in PL/SQL language.

20. The system according to claim 16, wherein the SQL instructions being written in TSQL language.

21. The system according to claim 16, wherein the system being used in a distributed computing environment wherein at least two computer systems being connected by the network, and the computer systems having computers of different types.

22. The system according to claim 16, wherein the stored procedures being provided for managing server network resources.

23. The system according to claim 16, wherein only nonproprietary database connections being required between the server and the console.

24. The system according to claim 16, wherein the SQL instructions being selected from a group comprising stored procedures, user defined functions and triggers.

25. The system according to claim 16, further comprising a means for invoking a database manager process for performing debugging in a fenced mode.

26. The system according to claim 16, wherein the debugger system providing call-stack tracking, line-by-line execution status reporting, line breakpoints management, variable change breakpoints management, and variable value reporting and modification capabilities.

27. The system according to claim 16, wherein the debugging being performed through debugger interface software instructions, inserted during compilation of the SQL instructions as debugger hooks, for tracing the execution of the SQL instructions.

28. The system according to claim 27, wherein the debugger interface software instructions including C Application Programming Interface (C API) calls as debugger hooks.

29. The system according to claim 28, wherein the inserted C API calls providing for each SQL instructions a source code line number for each SQL statement, names of variables declared by each SQL DECLARE statement, including SQL type information, names of variables modified by the SQL statement, a current SQL code and state, for each routine entry and exit information, and for each exception entry and exit information.

30. A program storage device readable by a computer tangibly embodying a program of instructions executable by the computer to perform a SQL debugging method within a computer system network, using stored procedures via a console for debugging of SQL instructions located in a server having a database management system for retrieving data from a database stored in an electronic storage device coupled to the server, the method comprising the step of:
(a) debugging of the server-side SQL instructions performed by a server-side debugger engine; and
(b) using stored procedures from a server-side debugger router as a database communication interface between the console and the debugger engine.

31. The method according to claim 30, wherein the stored procedures being located in the debugger router serving as a database communication interface for receiving commands and sending status reports between the console and the debugger engine.

32. The method according to claim 30, wherein the SQL instructions being written in Persistent SQL Modules (PSM) language.

33. The method according to claim 30, wherein the SQL instructions being written in PL/SQL language.

34. The method according to claim 30, wherein the SQL instructions being written in TSQL language.

35. The method according to claim 30, wherein the method being used in a distributed computing environment wherein at least two computer systems being connected by the network, and the computer systems having computers of different type.

36. The method according to claim 30, wherein the stored procedures being provided for managing server network resources.

37. The method according to claim 30, wherein only nonproprietary database connections being required between the server and the console.

38. The method according to claim 30, wherein the SQL instructions being selected from a group comprising stored procedures, user defined functions and triggers.

39. The method according to claim 30, further comprising the step of invoking a database manager process for performing debugging in a fenced mode.

40. The method according to claim 30, wherein the debugging method providing call-stack tracking, line-by-line execution status reporting, line breakpoints management, variable change breakpoints management, and variable value reporting and modification capabilities.

41. The method according to claim 30, wherein the debugging being performed through debugger interface software instructions, inserted during compilation of the SQL instructions as debugger hooks, for tracing the execution of the SQL instructions.

42. The method according to claim 41, wherein the debugger interface software instructions including C Application Programming Interface (C API) calls as debugger hooks.

43. The method according to claim 42, wherein the inserted C API calls providing for each SQL instruction a source code line number for each SQL statement, names of variables declared by each SQL DECLARE statement, including SQL type information, names of variables modified by the SQL statement, a current SQL code and state, for each routine entry and exit information, and for each exception entry and exit information.

44. The method according to claim 30, wherein the database communication interface enabling the console to command and monitor debugging operations of the server-side SQL instructions performed by the debugger engine.

* * * * *